Oct. 12, 1948.                F. P. LESCHINSKY                2,451,101
                          BULLDOZER-LOADER DEVICE

Filed Nov. 22, 1946                                     3 Sheets—Sheet 1

INVENTOR.
FRANCIS P. LESCHINSKY
BY George B. White
ATTORNEY

Oct. 12, 1948.  F. P. LESCHINSKY  2,451,101
BULLDOZER-LOADER DEVICE
Filed Nov. 22, 1946  3 Sheets-Sheet 2

INVENTOR.
FRANCIS P. LESCHINSKY
BY George B. White
ATTORNEY.

Oct. 12, 1948.   F. P. LESCHINSKY   2,451,101
BULLDOZER-LOADER DEVICE

Filed Nov. 22, 1946   3 Sheets-Sheet 3

INVENTOR.
FRANCIS P. LESCHINSKY
BY George B. White
ATTORNEY.

Patented Oct. 12, 1948

2,451,101

UNITED STATES PATENT OFFICE 2,451,101

BULLDOZER-LOADER DEVICE

Francis P. Leschinsky, Berkeley, Calif., assignor of one-half to Earl S. Waldie, Berkeley, Calif.

Application November 22, 1946, Serial No. 711,525

7 Claims. (Cl. 214—140)

This invention relates to a combination of a bulldozer and a dirt loader.

Various attempts have been made to combine a bulldozer with a dirt loader into one integrated mechanism carried and operated by a tractor or other prime mover. A dirt loader by necessity is located in front of the tractor carrying and operating the same, and it is quite bulky and heavy, particularly when loaded.

The leverage exerted by the weight of the loader when lifting a load, tilts the tractor and frequently upsets it. Thus in present practice such loaders are permitted to lift only comparatively small loads.

It is the object of this invention to provide a bulldozer loader attachment to a tractor or other prime mover, which is adapted to operate as a bulldozer, scraper and loader.

Another object of this invention is to provide a bulldozer-loader which is so constructed and attached to a tractor as to prevent tilting or upsetting the tractor, and which is capable of lifting comparatively heavier loads, than previous loaders of this type.

Another object of this invention is to provide a sub-frame which extends in front of the tractor carrying and operating the bulldozer-loader and which subframe is supported at its rear end in said tractor and at its front end on a stabilizing support spaced forwardly of the tractor frame, said sub-frame carrying the weight of the bulldozer-loader.

Another object of this invention is to provide a novel bucket for dozing, scraping and lifting dirt.

Another object of this invention is to provide a novel means for operating said bucket.

It will be understood that various changes in the details of construction may be made without departing from the spirit or scope of the invention as defined by the appended claims.

This invention is illustrated in the accompanying drawings, in which.

Figure 1:
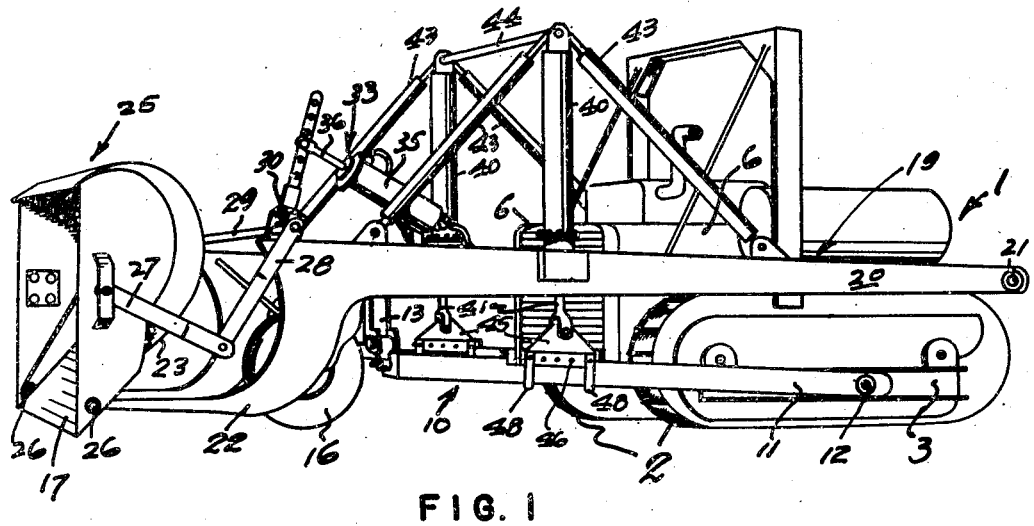
Fig. 1 is a perspective view of the device showing the same used as a bulldozer.

In general, my invention includes a tractor to the motor frame of which pivotally are attached the ends of the bulldozer-loader frame the free ends of which extend in front of said tractor and carry a bucket.

The bucket may be lowered to scrape the ground in front of the tractor, or may be lifted considerable distance above the ground and emptied.

The frame is operatively supported by suitable lifting device such as the hydraulic lifters shown. The lifters brace against a sub-frame extending forwardly from the tractor, the free end of which sub-frame is supported on a caster wheel spaced in front of the tractor. By this arrangement the weight of the bucket, the load therein contained, the lifters and the frame rests substantially between the tractor and the caster wheel, whereby the tendency to upset the tractor is eliminated. Furthermore, such arrangement permits to lift a much greater weight in the bucket as heretofore was possible in comparative size loaders used in the past.

In detail, my invention includes a prime mover such as a conventional tractor 1 having treads 2, a tread frame 3 resting on said treads and supporting a tractor frame 5 upon which a motor 6 rests.

A sub-frame 10 is operatively connected to the tractor 1, said sub-frame consisting of a pair of beams 11 one end of each of which is pivoted at 12 to the tread frame 3. The beams 11 extend beyond the front of the tractor 1 to a considerable distance and the front free ends thereof are connected by a cross beam 13 to the underside of which a caster wheel 15 is pivotally attached. If necessary the caster wheel 15 may have two tires arranged side by side instead of one tire 16 as shown in the drawing.

Above said sub-frame 10 there is arranged a loader frame 19 consisting of two parallel beams 20 the rear ends of which are pivotally connected to the tractor frame 5 at 21. The beams 20 extend forward beyond the beams 11 of the subframe 10, and their forward ends, connected by a beam 18 for rigidity are formed into bucket supports 22 which are curved downwardly and forwardly to accommodate the curved back 23 of a bucket 25. The front lower end of the bucket 25 is pivoted at 26 to the very ends of said bucket supports 22.

The curved back 23 forms the bottom of the bucket and terminates at its lower end in a flat transverse lip 17 inclined tangentially to the curvature of the back 23 to facilitate both the bulldozer action and loading and unloading of said bucket 25.

Figure 2:
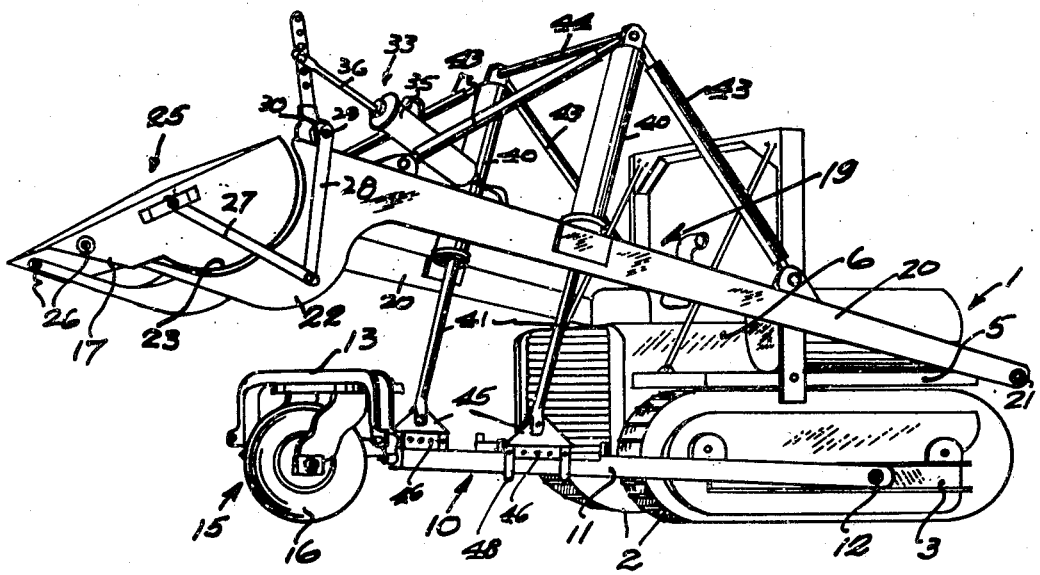
Fig. 2 is a perspective view of the device showing the same as a loader.
Figure 3:
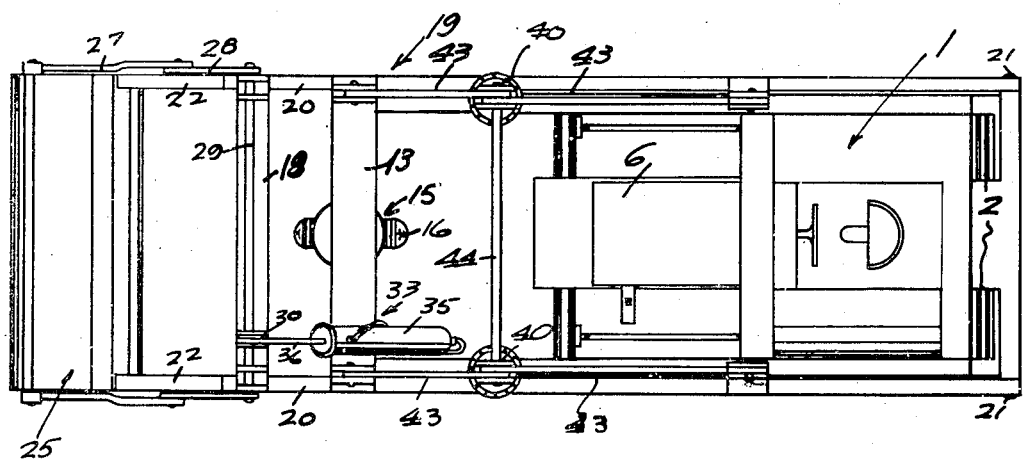
Fig. 3 is a plan view of the device as shown in Fig. 1.
Figure 4:
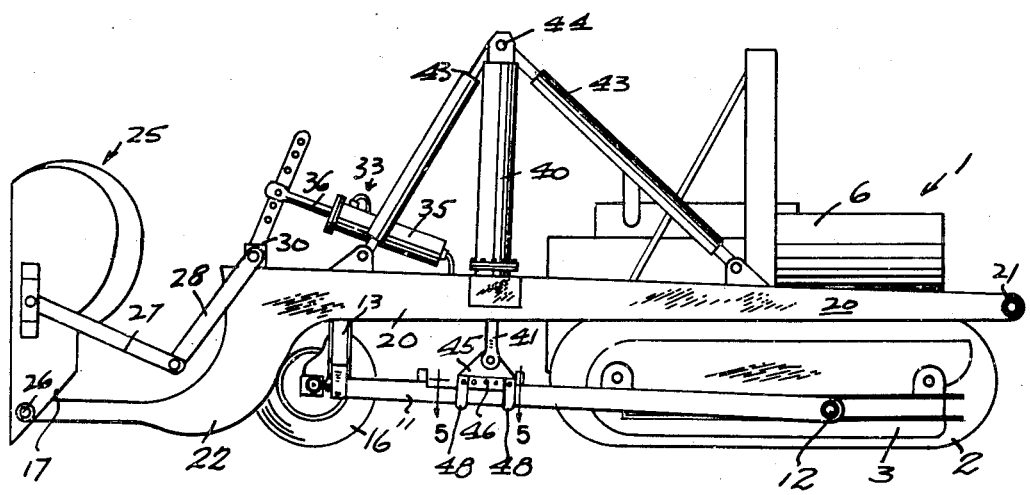
Fig. 4 is a side view of the device.
Figure 5:
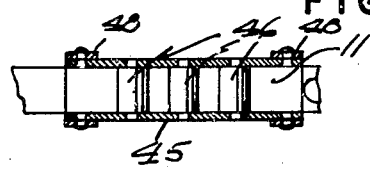
Fig. 5 is a detailed sectional view of the slide bracekt taken along the line 5—5 of Fig. 4.

The bucket 25 may occupy different angular positions in relation to said support 22. The mechanism for changing said position includes a pair of links 27 pivoted to the sides of the bucket, a pair of levers 28 pivoted to said links and being fixedly attached to a common shaft 29. The shaft 29 is journalled on the beams 20. A yoke 30 is fixedly attached to the shaft 29 and is operatively connected to a hydraulic operating operating means 33. The latter consists of a cylinder 35 and piston with a rod 36. Said piston rod is adjustably connected to a lever arm of the yoke 30. As illustrated in Figures 1, 2 and 4, the bucket 25 through the above described system of the links, levers, shaft and yoke may be brought to rest on the bucket supports 22 as shown in Figure 2, or pushed forwardly into a discharging position as shown in Figures 1 and 4, or held in scraper or bulldozer position as shown in Fig. 1. It is understood that the hydraulic means 33 is illustrative, but other suitable operating means may be used.

The beams 20 are arranged for swinging about their pivoted ends 21, and are operated by suitable lifters such as the hydraulic lifters shown herein. A cylinder 40 is arranged on each beam 20 between the tractor 1 and the bucket 25. The cylinders 40 extend upwardly and each has a piston rod 41 extending downwardly from the usual piston within said cylinder. The cylinders 40 are rigidly secured to said beams 20 by means of converging stays 43 and a cross bar 44 at the top. The lower ends of the piston rods 41 have pivotally connected thereto slide brackets 45, each of which has thereon a plurality of rollers 46 adapted to roll on the top of the beam 11 and is held in constant contact with the beam 11 by clamps 48 arranged therearound.

When the front end of the bulldozer frame 19 is lifted or lowered, the angle between the sub-frame 10 and said bulldozer frame is changed and for that reason, and also due to the fixed position of the cylinders 40, the slide brackets 45 shift to the left or to the right, respectively, in relation to the beams 11.

Figure 6:
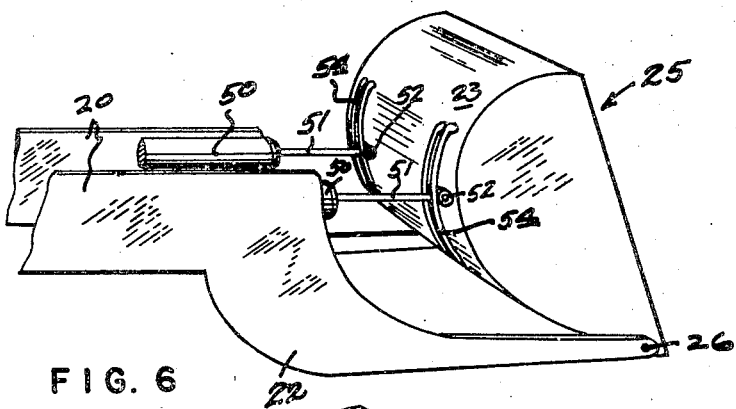
Fig. 6 is a perspective view of a bucket showing modified operating means.
Figure 7:
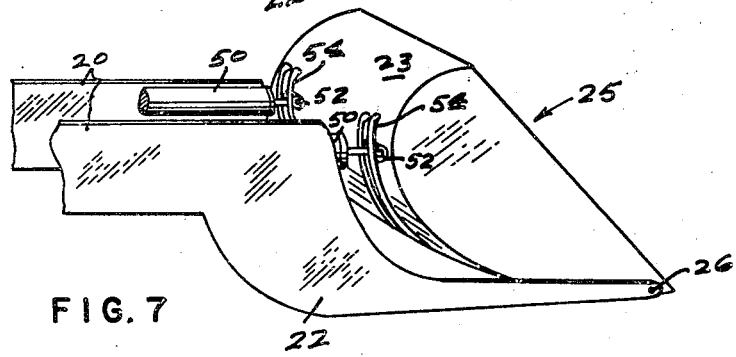
Fig. 7 is a perspective view of the bucket shown in Fig. 6, but shown in a lifting position.
Figure 8:
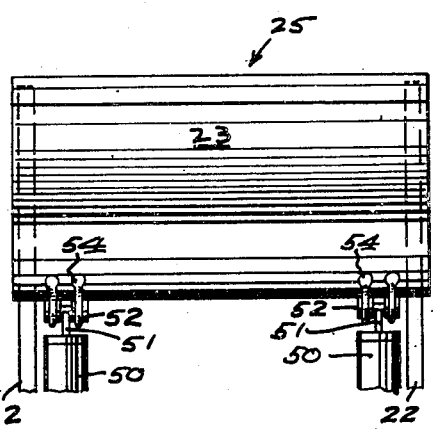
Fig. 8 is a plan view of the bucket shown in Fig. 7.

Figures 6, 7 and 8 show a different mechanism for changing position of the bucket 25 in relation to the bucket supports 22. The latter mechanism consists of a pair of hydraulic cylinders 50 each having a conventional piston and a piston rod 51 extending therefrom. Each piston rod 51 terminates in a cross-roller 52 which is adapted to roll between the back 23 of said bucket and the guides 54 affixed to said backs and extending downwardly parallel thereto. The cross-rollers 52, when pushed forwardly, force the bucket 25 out of its resting place to occupy dumping position, as shown in Fig. 6. Pulling said cross-rollers 52 toward the cylinders 50 swings said bucket around its pivots 26 back to the supports.

Figure 9:
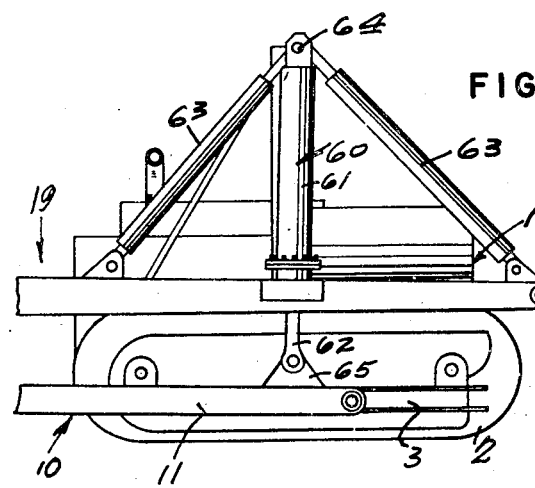
Fig. 9 is a partial side view of a modified arrangement of the lifting frame and device.

Fig. 9 shows a modified arrangement of the hydraulic lifters for lifting the front end of the bulldozer frame 19. The hydraulic lifters 60 consist of cylinders 61 each having a conventional piston and a piston rod 62 extending downwardly therefrom. The cylinders 61 are affixed to the bulldozer frame 19 by means of the stays 63 and a cross brace 64. The lower end of the piston rod 62 is pivoted to a bracket 65 welded or otherwise attached to the beams 11 of the sub-frame 10. Due to the close location of the bracket 65 to the pivotal point 12 the dislocation of the shaft 62 in relation to the beam 11, because of the change in the angle between the sub-frame 10 and the bulldozer frame 19, is comparatively negligible and permits the fixing of said bracket 65 to said beams 11. The bulldozer-loader is preferably built of heavy steel beams so as to withstand rough handling and heavy work. The bucket position is selectively controlled through the medium of said hydraulic means 33 for scraping, bull-dozing, lifting or dumping. The arrangement of the caster wheel 15 in front of the tractor 1 prevents the tractor being tilted forwardly, keeps the tractor level and distributes the weight of the bucket 25 and the bulldozer frame 19 between the caster wheel 15 and the tractor 1.

I claim:

1. A combination of a prime mover with a bulldozer-loader attachment comprising a frame one end of which is pivoted to the prime mover frame, and a bucket pivotally arranged on the other end of the frame; means for changing the position of said bucket in relation to said frame; means for lifting and lowering the frame; a sub-frame extending from said prime mover beyond the front thereof and mounted independently of said first frame; and a wheel supporting the front end of said sub-frame; said means for lifting or lowering the frame resting on said sub-frame.

2. A combination of a prime mover with a bulldozer-loader attachment, comprising a sub-frame pivoted to the prime mover and having the other end supported on a wheel; a bulldozer frame pivoted to the prime mover; and means for lifting the free end of said bulldozer frame, said means bracing against said sub-frame.

3. A combination of a prime mover with a bulldozer-loader, comprising a frame pivotally connected to said prime mover at one end, a bucket carried by the free end of said frame, a sub-frame one end of which is pivotally connected to said prime mover; a wheel between said bucket and said prime mover supporting the forward end of said sub-frame, and means for lifting and lowering the said frame, around its pivot, said lifting means connecting said frame to said sub-frame.

4. A combination with a tractor having a tractor frame and a tread frame, of a bulldozer-loader attachment, comprising a sub-frame one end of which is pivotally connected to the tread frame; a caster wheel spaced forwardly from the front of the tractor supporting the other end of said sub-frame; a bulldozer frame pivoted to the tractor frame at one end; a bucket pivotally carried on the other end of said bulldozer frame spaced forwardly from said wheel; means for changing the angular position of said bucket in relation to the frame; and means arranged between said sub-frame and bull-dozer frame for controlled changing of the relative angular position of the frame.

5. The combination with a tractor having a tractor frame and a tread frame; of a bulldozer-loader attachment, comprising a sub-frame extended beyond an end of the tractor frame and being pivoted thereon, a substantially universal wheel support on the free end of said sub-frame, a bulldozer-loader frame pivoted on the tread frame and extended above and beyond said sub-frame, a bulldozer-loader bucket adjustably mounted on the free end of said bulldozer-loader frame, and means bracing against said sub-frame and working on said bulldozer-loader frame for lifting and lowering the latter around its pivot.

6. The combination with a tractor having a tractor frame and a tread frame; of a bulldozer-loader attachment, comprising a sub-frame extended beyond an end of the tractor frame and being pivoted thereon, a substantially universal wheel support on the free end of said sub-frame, a bulldozer-loader frame pivoted on the tread frame and extended above and beyond said sub-frame, a bulldozer-loader bucket adjustably mounted on the free end of said bulldozer-loader frame, and lifting means for the bulldozer-loader frame bracing against said sub-frame, between said wheel support and the front end of said tractor.

7. The combination with a tractor having a tractor frame and a tread frame; of a bulldozer-loader attachment, comprising a sub-frame extended beyond an end of the tractor frame and being pivoted thereon, a substantially universal wheel support on the free end of said sub-frame, a bulldozer-loader frame pivoted on the tread frame and extended above and beyond said sub-frame, a bulldozer-loader bucket adjustably mounted on the free end of said bulldozer-loader frame, and means bracing against said sub-frame and working on said bulldozer-loader frame for lifting and lowering the latter around its pivot, and adjustable control mechanism for said bucket including pivoted links pivoted to the bucket and to one another, a turning device for said links, and control mechanism adjustably connected to said turning device.

FRANCIS P. LESCHINSKY.

REFERENCES CITED

The following references are of record in the file of this patent:

UNITED STATES PATENTS

| Number | Name | Date |
|---|---|---|
| 2,029,122 | Stout, Jr. | Jan. 28, 1936 |
| 2,300,801 | Parker | Nov. 3, 1942 |
| 2,383,686 | Ryan | Aug. 28, 1945 |
| 2,387,764 | Maxwell | Oct. 30, 1945 |
| 2,413,097 | Barker | Dec. 24, 1946 |
| 2,417,544 | Coleman | Mar. 18, 1947 |
| 2,418,251 | Drott | Apr. 1, 1947 |
| 2,418,299 | Gorsuch | Apr. 1, 1947 |